United States Patent [19]

Schwarz

[11] Patent Number: 4,461,514

[45] Date of Patent: Jul. 24, 1984

[54] RETENTION CLIP FOR WHEEL COVERS

[76] Inventor: James Schwarz, P.O. Box 9310, Daytona Beach, Fla. 32020

[21] Appl. No.: 533,652

[22] Filed: Sep. 19, 1983

[51] Int. Cl.³ .............................................. B60B 7/06
[52] U.S. Cl. .............................. 301/37 CD; 301/37 P; 24/293; 24/295; 29/159 A
[58] Field of Search ................ 301/37 R, 37 T, 37 C, 301/37 CD, 37 P, 37 PW, 108 R; 24/293, 295, 334, 337; 29/159 A

[56] References Cited

U.S. PATENT DOCUMENTS

| | | | |
|---|---|---|---|
| 3,873,161 | 3/1975 | Kretschmer | 301/37 CD X |
| 4,231,619 | 11/1980 | Beisch et al. | 29/159 A X |
| 4,383,716 | 5/1983 | Osborn | 301/37 P X |
| 4,427,238 | 1/1984 | Connell | 301/37 P |

Primary Examiner—David A. Scherbel
Attorney, Agent, or Firm—Duckworth, Allen, Dyer & Pettis

[57] ABSTRACT

A double retention clip for securing wheel covers, wheel trim rings, or the like to automotive wheel rims. A J-shaped spring steel clip is provided having barbed tabs on an inner arm portion. The inner arm portion is inserted in a recessed boss of the wheel cover and secured by the barbs. An outer arm includes a cam portion and an inbent portion having barbs at the outer end thereof. When a wheel cover is installed with the clips, the barbed inbent portion engages the inner axial flange portion of the wheel rim and the cam portion engages the inner surface of the annular axial safety hump of the wheel rim. Both the cam portion and the inbent portion are then under high outward radial tension.

5 Claims, 6 Drawing Figures

4,461,514

RETENTION CLIP FOR WHEEL COVERS

BACKGROUND OF THE INVENTION

1. Field of the Invention

The present invention relates to vehicle trim rings and wheel covers and more particularly to clip-type retainers for securing such trim and covers to an axial flange of a wheel.

2. Description of the Prior Art

In modern day automobiles, wheel covers and trim rings for the wheels have become very elaborate and expensive. Therefore, it is extremely important to provide means for retaining such covers and trim during normal use, yet to be able to remove covers and trim for changing tires and the like without undue difficulty or damage to the retaining means.

In the past, it has been common to depend upon forming the edges of metal wheel covers and trim rings to bite into the wheel structure when installed. However, in recent years, the use of strong plastic wheel covers and trim rings having at the most a thin metal covering has precluded this type of retaining method. A number of spring steel clip structures have been developed which generally fit into bosses of the plastic cover bodies and in which the distal ends may have cam surfaces, barbs, or tabs which may fit into recesses in the wheel structure. Typical of this type of retaining device are those shown in U.S. Pat. Nos. 4,328,997; 4,363,520; 4,003,604; 4,231,619; and 3,873,161. These patents teach retaining clips which are formed from spring steel and depend upon contact of one cam or barb surface with the wheel rim. Several of the clips are spaced circumferentially around the wheel cover or trim ring and engage the wheel rim. Should one of the clips become deformed, such as is easily possible in removing and reinstalling or from road hazards, an opportunity for distortion of the covers or rings results with possible loss thereof.

SUMMARY OF THE INVENTION

The present invention is an improved wheel cover and trim ring retaining clip having a double wheel rim contacting element. In one implementation of the invention, a spring steel J-shaped clip is provided having an inner arm portion which, when installed, extends axially and is inserted into a recess of a wheel cover or trim ring boss. Preferably, barbed tabs are provided in the inner arm portion of the clip to securely hold the clip in the boss recess. The J portion comprises a transition from the inner arm in the form of a bight to a short outer arm portion. The outer arm bends axially outward with respect to the inner arm. The end of the outer arm is in-bent radially to form a cam portion. A central portion of the inner arm is cut so that it may be bent axially outward to a sharper angle than the outer arm. Each lateral edge of the central portion is appropriately cut and bent upward to form a pair of barbs at the outer end of that portion of the arm with the extreme outer end bent radially inward. As may be understood, double retaining surfaces are thus provided, comprising one cam portion and one barbed portion.

In use, a multiplicity of the improved spring clips of the invention are installed in the axial wheel cover or trim ring boss slots. The cover or ring is then placed onto the outside of a vehicle wheel rim such that the cam portion and the barb portions of the spring clip contact the interior annular axial flange portion of the wheel. The wheel cover or trim ring is forced axially inward until the cam sections of the spring clip drop into the inner surface of the annular axial safety hump region of the wheel rim. The action of forcing the wheel cover axially inward places the outer arm and cam portion under tension. Simultaneously the central portion of the inner arm having the barbs is forced radially inward such that when the cam portions drop into the inner safety hump region, the barbs are under high outward radial tension which tends to force the sharp points of the barb into the inner annular axial flange portion of the wheel rim.

As may now be understood, the double spring clip of the invention produces an advantageous double locking action. This may translate into a greatly reduced likelihood of problems due to damage of one or more of the retaining clips in removing and replacing wheel covers or trim rings It is therefore a principal object of the invention to provide a spring steel retaining clip for wheel covers, wheel trim rings, and the like having a double acting locking element.

It is another object of the invention to provide a double spring steel retaining clip in which a cam surface engages the inner safety hump area of a vehicle wheel rim and a barbed portion engages the inner annular axial flange portion of the vehicle wheel hub.

It is yet another object of the invention to provide a double engaging spring steel retaining clip for wheel covers and the like in which damage to one of the wheel engaging elements will not jeopardize the integrity of the retaining system.

It is yet another object of the invention to provide a double spring steel retaining clip in which fewer clips are required for the same retaining integrity as required with known single locking element retaining clips.

These and other objects and advantages of the invention will become apparent from the following detailed description when read in conjunction with the drawings.

DETAILED DESCRIPTION OF THE PREFERRED EMBODIMENT

Figure 1:
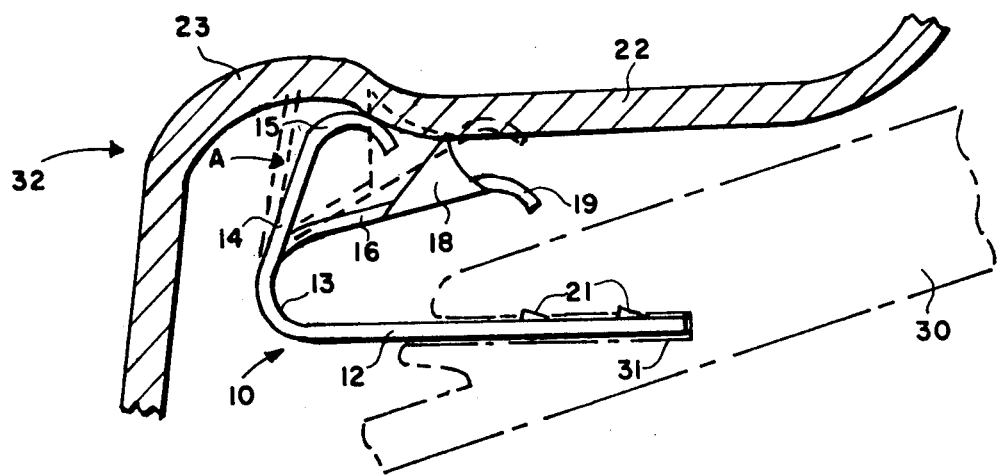
FIG. 1 is a cross sectional view of a portion of a vehicle wheel showing the double spring retaining clip of the invention in a normal operative position with respect to the wheel.
Figure 2:
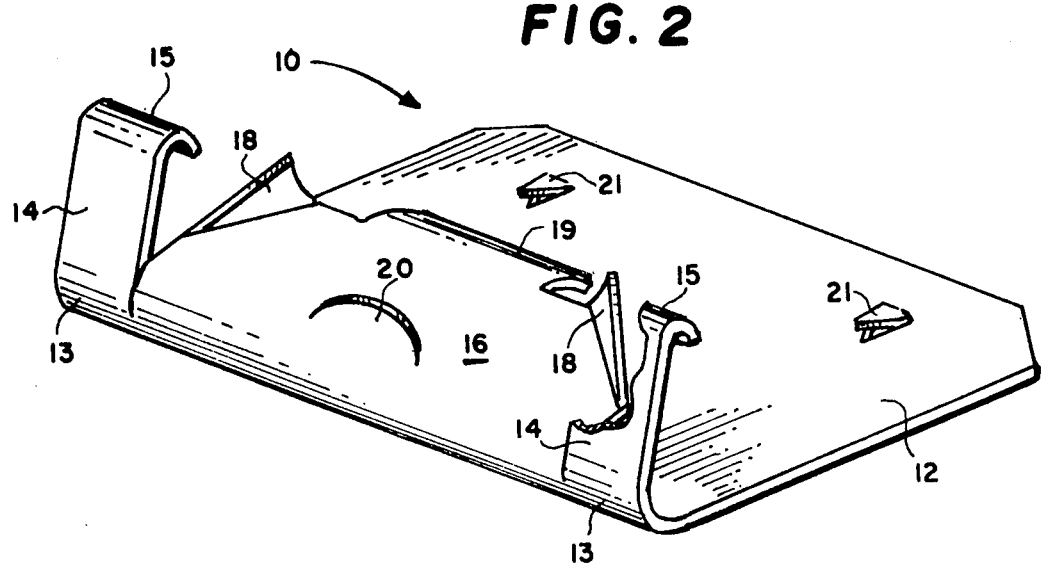
FIG. 2 is a perspective partially cut away view of the retaining clip of FIG. 1.

Referring first to FIGS. 1 and 2, a unitary version of a spring retaining clip 10 in accordance with the invention is shown in side view. A boss 30 is indicated in phantom view and may be a part of a wheel cover or wheel trim ring to be attached to a vehicle wheel 32 shown in partial cross sectional view. Boss 30 includes a recess 31 for accepting an inner arm portion 12 of retaining clip 10. As best seen in FIG. 2, inner arm 12 is essentially rectangular in shape and may include barbs 21 punched therethrough. It is to be understood that spring clip 10 is manufactured from hardened spring steel such that the insertion of inner arm 12 into recess 31 causes barbs 21 to dig into the plastic material of boss 30 and to hold spring clip 10 securely in place. Although barbs 21 are shown in FIG. 2 to be triangular in shape, it will be obvious to those of skill in the art that other shapes are equally applicable.

Inner arm 12 is connected to outer arm 14 at either edge of inner arm 12 by a bight area 13 with a cam section 15 at the distal end of outer arm 14. As may be noted in FIG. 2, the two outer arms 14 are formed by folding a central portion 16 of the outer arm inward forming a tighter bight area 13. As will be noted, center area 16 is bent axially inward with respect to inner arm 12 and its outer edge 19 may be further bent in radially. The corners of central portion 16 are turned upward with respect to the outer surface thereof to form barbs 18.

As seen in FIG. 1 in which retaining clip 10 is in its normal operative position, cam 15 has been bent axially inward from its relaxed position shown by the dashed lines to the position shown in which cam section 15 is in contact with the inner surface 24 of the annular safety hump 23 of vehicle wheel 32. Similarly, central portion arm 16 has been bent radially inward from its normal position indicated by the dashed lines to the position shown in which the points of barbs 18 are contacting the interior surface of the annular axial flange portion 22 of vehicle wheel 32. Due to the tension created by the bending of arms 14 and 16 the wheel cover or wheel trim is very securely locked to the vehicle wheel. If during removal of a wheel cover or wheel trim ring, either arm 14 or central arm 16 were bent or distorted, the retaining clip 10 would still have retaining capability remaining.

Figure 3:
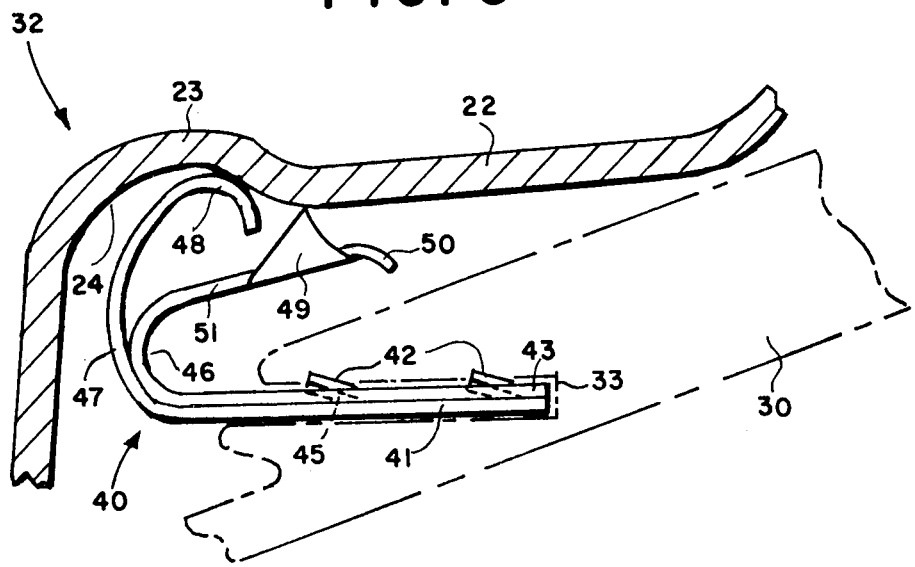
FIG. 3 is a partial cross sectional view of a vehicle wheel showing the position of an alternative embodiment of the dual retaining clip of the invention in its normal operative position.

Turning now to FIG. 3, an alternative embodiment of the improved retaining clip of the invention is shown. Clip 40 comprises an outer element having a first inner arm 41, a curved portion 47 curling radially outward and a curved cam portion bent radially inward, and an inner element comprising inner arm 43, bight 46, outer arm 51, barb 49, and radially inwardly turned end 50. Inner arm 43 and inner arm 41 are contiguous forming a two-ply composite arm. As seen in the top view of FIG. 4, barbs 42 which, in this instance, are semi-circular in shape are punched in inner arm 43 and interlock with barbs 45 in inner arm 41 to maintain the two elements together. Boss 30 shown in phantom view may be seen to have a larger recess 33 than in FIG. 1. This is to permit the two-ply inner arm to be inserted therein with barbs 42 securing the clip 40 in place.

As will be noted, cam surface 48 contacts the safety hump channel 24 in the same manner as cam 15 in FIG. 1. Similarly, barb 49 contacts the inner surface of the annular axial flange portion 22 in the same manner as barb 18 in FIG. 1.

Figure 4:
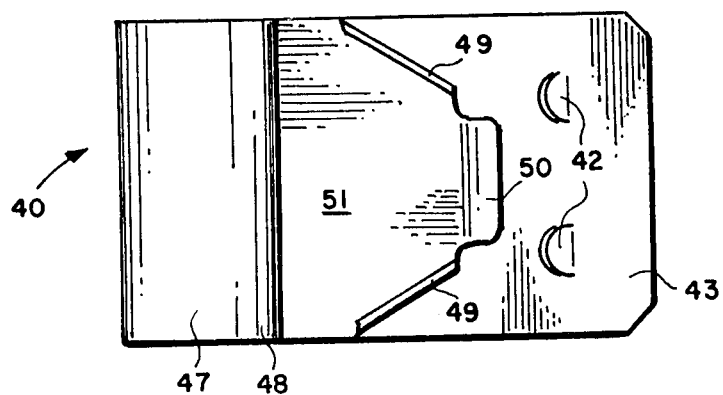
FIG. 4 is a top view of the spring clip of FIG. 3.

In the top view of clip 40 of FIG. 4, it may be seen that outer arm 47 and cam surface 48 is continuous across the entire width of clip 50. An advantage obtains from this construction in that a higher tension may be provided for cam 48 in safety hump channel 24. Thus, it is especially suitable for heavier and larger wheel covers without the necessity of increasing the number of clips with an attendant increase in cost of the installation.

Figure 5:
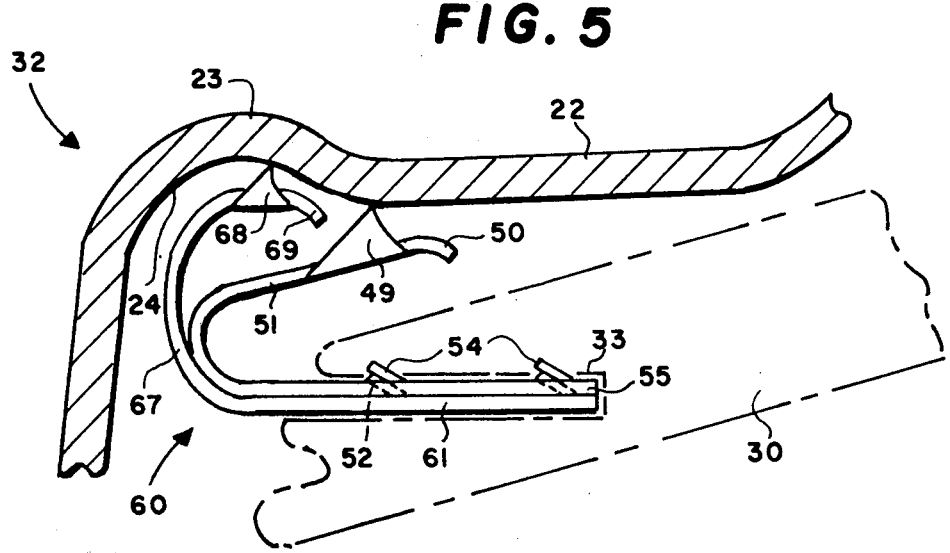
FIG. 5 is a partial cross sectional view of a vehicle wheel showing another alternative embodiment of the invention in which the wheel contacting element contacting the inner safety hump surface includes a barbed portion.

The alternative embodiment just described with reference to FIGS. 3 and 4 can be further improved for greater security with the modification indicated in FIGS. 5 and 6. FIG. 5 shows a partial cross section of vehicle wheel 32 with retaining clip 60 shown installed in boss 30 and in operative position with respect to the rim of wheel 32. Clip 60 differs from clip 40 in that cam 48 at the distal end of the first clip element is replaced with a barb 68 and a inwardly turned end 69. In this arrangement, barbs 68 will bite into the surface of the annular inner surface of the safety hump in addition to the biting action of barb 49 on the annular axial flange portion. This alternative embodiment of the invention makes it possible to obtain the same retention capability with fewer retaining clips 60 than would be possible with prior art single barb retaining clips.

Figure 6:
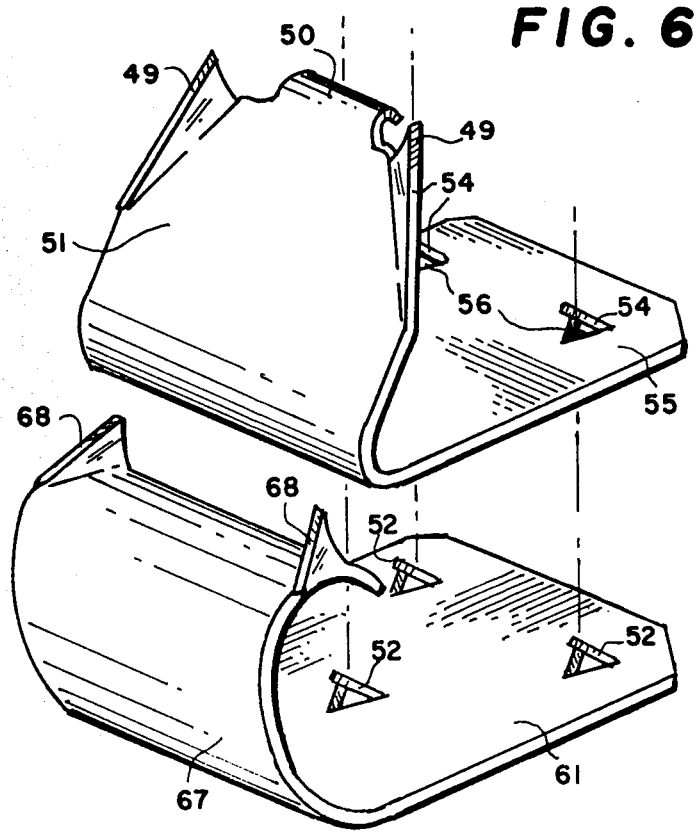
FIG. 6 is a perspective view of the clip of FIG. 5 in which the two sections thereof are shown separated.

Retaining clip 60 is shown in perspective view in FIG. 6 with inner clip 55 shown separated from outer clip 61. As indicated by the dashed lines, barbs 52 of clip 61 interlock through barb openings 56 of clip 55 when the two clips are joined together as shown in FIG. 5. It may be noted that barbs 52 and 54 are triangular in shape in this example. Various other shapes are also suitable in accordance with the invention.

Although certain exemplary versions of the invention have been described in detail, it will be clear that various modifications can be made thereto without departing from the spirit or scope of the invention.

I claim:

1. A retaining clip for attaching automobile wheel covers and trim rings to a vehicle wheel having an annular safety hump and an interior annular axial flange comprising:
    a J-shaped spring clip, said clip having an inner arm portion, a short outer arm portion, and a bight forming a transition from said inner arm portion to said outer arm portion;
    a plurality of barbed tabs formed in said inner arm portion;
    said outer arm portion having a first section at a first acute angle to said inner arm portion, said first section terminating in a pair of upward bent barbs;
    said outer arm portion having a second section at a second acute angle greater than said first acute angle, said second section terminating in an inbent cam portion; and
    said inner arm portion adapted to be inserted in a boss recess of a wheel cover or trim ring, said cam portion adapted to engage the interior of said annular safety hump and said barbs adapted to engage said interior annular axial flange.

2. The device as defined in claim 1 in which said clip is formed from spring steel.

3. The device as defined in claim 1 in which said barbed tabs are adapted to secure said inner arm portion in a boss recess of a wheel cover or trim ring.

4. A double retaining clip for attaching automobile wheel covers and trim rings to a vehicle wheel having and annular safety hump and an interior annular axial flange comprising:
    a first J-shaped spring clip body having a first inner arm, a first short outer arm and a first bight forming a transition from said first inner arm to said first outer arm;

a plurality of first barbed tabs formed in said first inner arm;

said first outer arm at a first acute angle to said first inner arm, said first outer arm terminating in a pair of upward bent barbs for engaging said interior annular axial flange;

a second J-shaped spring clip body having a second inner arm, a second short outer arm and a second bight forming a transition from said second inner arm to said second outer arm, said second outer arm at a second acute angle to said second inner arm, said second angle greater than said first angle, said second inner arm terminating in an inbent cam portion;

a plurality of second barbed tabs formed in said second inner arm, said first spring clip body disposed within said second spring clip body with said first inner arm contiguous with and overlying said second inner arm, said first and second barbed tabs adapted to be engaged for maintaining said first and second inner arms in contact;

said contiguous first and second inner arms adapted to be inserted in a boss recess of a wheel cover or wheel trim, said cam portion of said second spring clip body adapted to engage the interior of said annular safety hump and said barbs of said first outer arm adapted to engage said interior annular axial flange.

5. The device as defined in claim 4 which further includes barbs disposed on said cam portion for engaging said annular safety hump.

* * * * *